United States Patent [19]

Miake et al.

[11] Patent Number: 5,438,426
[45] Date of Patent: Aug. 1, 1995

[54] IMAGE INFORMATION PROCESSING APPARATUS

[75] Inventors: Michiyori Miake; Ai Soga, both of Nara, Japan

[73] Assignee: Sharp Kabushiki Kaisha, Osaka, Japan

[21] Appl. No.: 186,371

[22] Filed: Jan. 25, 1994

[30] Foreign Application Priority Data

Mar. 19, 1993 [JP] Japan .................. 5-060563

[51] Int. Cl.⁶ ............................. H04N 1/00
[52] U.S. Cl. ................... 358/403; 358/486; 358/404; 358/463; 358/468; 355/308
[58] Field of Search ............. 358/403, 400, 404, 444, 358/440, 498, 496, 467, 468, 402, 407, 500, 512, 464, 448, 463, 401, 486

[56] References Cited

U.S. PATENT DOCUMENTS

| | | | |
|---|---|---|---|
| 4,839,740 | 6/1989 | Yoshida | 358/448 |
| 5,161,037 | 11/1992 | Saito | 358/448 |
| 5,243,439 | 9/1993 | Jacobus et al. | 358/444 |
| 5,247,591 | 9/1993 | Baran | 358/440 |
| 5,267,303 | 11/1993 | Johnson et al. | 358/468 |
| 5,329,382 | 7/1994 | Mita | 358/463 |

FOREIGN PATENT DOCUMENTS 62-154847 3/1987 Japan .
63-36671 1/1988 Japan .
222238 3/1988 Japan .
4-86759 7/1992 Japan .
4-321183 11/1992 Japan .

*Primary Examiner*—Edward L. Coles, Sr.
*Assistant Examiner*—Fan Lee
*Attorney, Agent, or Firm*—Nixon & Vanderhye

[57] ABSTRACT

An information processing apparatus includes a scanner device for reading documents M as image information, and a filing device for separating the image information thus read into groups and filing each group of information as a block of document data. The filing device has ROM storing a monochrome-sheet-using separation designating routine which is programmed to extract a monochrome sheet such as entirely white or black sheet as a separating sheet by detecting whole colors in a specified area of a sheet and to designate a grouping of document data by the separating sheet. With this structure, it is possible to use a plain monochrome sheet such as an ordinary white sheet as the separating sheet for separating a plurality of documents into groups for filing each group as a block of document data. In addition, since there is no need to provide a light emitting section and a light receiving section for judging the separating sheet, the manufacturing cost is reduced. Furthermore, when the entirely monochrome sheet is used, the criteria for identifying the separating sheet are eased, thereby improving the accuracy of recognizing the separating sheet.

19 Claims, 17 Drawing Sheets

IMAGE INFORMATION PROCESSING APPARATUS

FIELD OF THE INVENTION

The present invention relates to an information processing apparatus for separating a plurality of documents into groups using a separating sheet inserted into the documents and filing image information of each group of the documents as a block of document data.

BACKGROUND OF THE INVENTION

Information processing apparatuses which separate a plurality of documents into groups by a separating sheet inserted into the documents and file image information of each group of the documents as a block of document data have been suggested (see Japanese Publication for Unexamined Patent Applications No. 233059/1990 and 91867/1991).

For example, a special cut sheet P' shown in FIG. 11 and a specific-image printing sheet S' shown in FIG. 12 are used as the separating sheet. As illustrated in FIG. 13, an image information processing apparatus using the special cut sheet P' includes a scanner device 30 and a filing device 40.

The scanner device 30 has a pair of light emitting section 31 and light receiving section 32 for reading the image information contained in a document, and another pair of a light emitting section 33 and a light receiving section 34 for identifying the sheet P'. The filing device 40 has CPU 41, ROM 42, RAM 43, an information storing section 44, an image input section 45, and a light-transmitting-mark input section 46. The image information from the light receiving section 32 is input to the image input section 45. The light-transmitting-mark information detected at the light receiving section 34 according to the shape of the sheet P' is input to the light-transmitting-mark input section 46.

As illustrated in FIG. 14, an information processing apparatus using the specific-image printing sheet S' is formed by removing the light-transmitting-mark input section 46, the light emitting section 33 and the light receiving section 34 for identifying the sheet P' from the image information processing apparatus of FIG. 13. In FIG. 14, the members having the same functions as those in FIG. 13 are designated by the same numerals. In the image information processing apparatus, the specific-image printing sheet S' is identified by an identifying section, not shown, using software managed by the CPU 41, ROM 42 and RAM 43.

The process of filing documents in the image information processing apparatus using the special cut sheet P' is discussed below with reference to the flowchart of FIG. 15. The special cut sheet P' is inserted in advance into locations at which a plurality of documents M are separated.

First, temporary storage locations in the information storing section 44 are specified for the respective groups of the documents (step 81). Secondly, the first storage location in the information storing section 44 is specified for the image information of a sheet (step 82). Then, the image information read by the scanner device 30 is input to the image input section 45 of the filing device 40 (step 83).

Upon the input of the image information, whether light-transmitting-mark information is input to the light-transmitting-mark input section 46 is judged (step 84). In step 84, if no light-transmitting-mark information has been input, the input image information is stored in the specified location in the information storing section 44 (step 85). Then, the operation proceeds to step 87 to be discussed later. On the other hand, if light-transmitting-mark information has been input in step 84, the operation proceeds to step 86 and the next storage location in the information storing section 44 is specified. The operation then returns to step 83.

Step 87 judges if there is a next sheet to be read. If there is a next sheet to be read, the operation returns to step 83. If not, the filing process is complete.

Next, with reference to the flowchart of FIG. 16, the following description discusses a process of filing a document in which a storage location is specified after inputting the image information.

First, a temporary storage location in the information storing section 44 in which image information is to be stored is specified (step 91). Secondly, the image information read by the scanner device 30 is input to the image input section 45 of the filing device 40 (step 92). Upon the input of the image information, whether light-transmitting-mark information is input to the light-transmitting-mark input section 46 is judged (step 93). In step 93, if the light-transmitting-mark information has not been input, the input image information is temporarily stored in the specified location in the information storing section 44 (step 94). Then, the operation proceeds to step 96 to be discussed later. On the other hand, if light-transmitting-mark information has been input in step 93, the operation proceeds to step 95 and the light-transmitting-mark information as separation designating information is temporarily stored. The operation then returns to step 96.

Step 96 judges if there is a next sheet to be read. If there is a next sheet to be read, the operation returns to step 92. If there is no sheet to be read next, a permanent storage location in the information storing section 44 is specified for each group of the documents (step 97), and then the first storage location in the information storing section 44 is specified (step 98).

The image information stored in the temporary storage location is called in sequence (step 99), and whether each piece of image information called is the light-transmitting-mark information or not is judged (step 100). In step 100, if the image information is not judged the light-transmitting-mark information, the image information is permanently stored in the specified location in the information storing section 44 (step 101), and the operation proceeds to step 103. On the other hand, if the image information is judged to be the light-transmitting-mark information, the next storage location in the information storing section 44 is specified (102), and the operation proceeds to step 103 as to be discussed later.

Step 103 judges if there is information to be processed next in the respective temporary storage locations in the information storing section 44. If the next information to be processed is stored, the operation again returns to step 99. If the next information to be processed is not stored, the filing process is complete.

The process of filing a document in the image information processing apparatus using the specific-image printing sheet S' is discussed below with reference to the flowchart of FIG. 17. The specific-image printing sheet S' is inserted in advance before the first page of each group of documents.

First, image information read by the scanner device 30 is input to the image input section 45 of the filing device 40 (step 111). Then, whether the image information is classification control information or not, i.e. whether the sheet is a separating sheet (specific-image printing sheet S') or a document M is judged (step 112).

In step 112, if the sheet is judged the specific-image printing sheet S', the operation proceeds to step 113, and class information (classification control information) is read out. Next, if there is a scale around the specific-image printing sheet S' or not is judged (step 114). If there is no scale, the operation proceeds to step 115, and an error message relating to the separating sheet is displayed. Then, the filing process designed for the error condition is complete.

Meanwhile, if there is a scale around the specific-image printing sheet S' (step 114), whether format information is contained or not is judged by reading an optical mark (step 116). If there is no format information, the error message is displayed in step 115 and the process is complete in the manner mentioned above. On the other hand, if the format information is contained in step 116, a classification code is read out from the specific-image printing sheet S' by reading an optical mark (step 117). Then, a location where the image information of the document M to be stored is determined according to the classification code (step 118). Next, handwriting recognition information is read out from the specific-image printing sheet S' by an optical character reading system (step 119), and the name of the document is recorded (step 120). Then, the operation proceeds to step 123 to be discussed later.

In step 112, if the sheet is judged the document M, the operation proceeds to step 121, and whether a location where the image information of the document M to be stored has been determined or not is judged. In step 121, if the location has not yet to be determined, the operation proceeds to step 115. On the other hand, if the location has been determined, the image information is stored in the location specified by the specific-image printing sheet S' (step 122), and if there is a next sheet to be read is judged (step 123). If there is a sheet to be read a next in step 123, the operation returns to step 111. On the other hand, if there is no sheet to be read next, the filing process designed for the proper condition is complete.

As described above, with the system using a special cut sheet, it is necessary to judge the separation designating information using the special cut sheet P' and to separately specify a location for the input image information before or after inputting the image information. Meanwhile with the system using a specific-image printing sheet, the processing is automatically performed by recording on the specific-image printing sheet S' information necessary for specifying storage locations, a method of recording, and the name of records in advance.

However, with the above-mentioned conventional image information processing apparatus using the special cut sheet P', there is a need to provide the light emitting section 33 and the light receiving section 34 for reading a light transmitting mark in addition to the light emitting section 31 and the light receiving section 32 for reading a document. Such a structure causes an increase in the manufacturing cost. Moreover, the sheet P' to be used as a separating sheet is not a general-purpose use sheet due to its special shape, and, in practice, made from a synthetic film material so as to give a strength allowing a repeated use. This also result in an increase in the manufacturing cost.

With the above-mentioned conventional image information processing apparatus using the specific-image printing sheet S', the specific-image printing sheet S' is easily prepared by inputting data and printing out the data using a sheet preparing function of the apparatus. However, if the sheet S' becomes dirty, faulty recognition tends to occur. Thus, the sheet S' is not suitable for a repeated use.

SUMMARY OF THE INVENTION

An object of the present invention is to provide an image information processing apparatus which achieves a reduction in the manufacturing cost by using a sheet of a simple shape made of an inexpensive material as a separating sheet for separating a plurality of sequentially read documents into groups in filing but without a special sensor for recognizing the separating sheet.

Another object is to provide an image information processing apparatus which improves the accuracy of recognizing the separating sheet by preventing a faulty recognition of the separating sheet.

In order to achieve the above objects, an image information processing apparatus of the present invention includes at least:

(1) inputting means for sequentially inputting a plurality of documents as image information;

(2) monochrome-sheet-using separation designating means for detecting whole colors in a specified area of sheets to extract a monochrome sheet as a separating sheet from the plurality of documents and for designating a grouping of the input image information according to a position of the monochrome sheet inserted; and (3) memory means for separating the image information into groups in accordance with an output of the monochrome-sheet-using separation designating means and filing each group of the image information as a block of document data.

With this structure, a monochrome sheet is extracted as the separating sheet from a plurality of document by detecting whole colors in the specified area of the sheets by the monochrome-sheet-using separation designating means. The pieces of image information are separated into groups according to the position of the monochrome sheet inserted, and each group of the image information is designated as a block of document data.

This structure enables the plain monochrome sheet such as an ordinary sheet of entirely white color to be used as the separating sheet for grouping the documents without using a special sensor. Accordingly, the cost of manufacturing the apparatus is reduced and the criteria for judging the separating sheet are eased. As a result, the accuracy of recognizing the separating sheet is improved.

The handling of the image information processing apparatus having the above-mentioned means is improved by adding (4) classification controlling means for extracting a classification control sheet inserted before or after the monochrome sheet and controlling a grouping of the document data in accordance with classification control information indicated by the classification control sheet.

Namely, since a storage location for the document data is automatically specified according to the classification control information, there is no need to specify the storage location before or after inputting the image information.

The above-objects are also achieved by including into the image information processing apparatus the following means:

(1) inputting means for sequentially inputting a plurality of documents as image information;

(2) specific-image-using separation designating means for extracting a sheet having a specific image printed thereon as a specific-image printing sheet from the plurality of documents by distinguishing the specific image and designating a grouping of the input image information of the documents according to a position of the specific-image printing sheet inserted; and (3) memory means for separating the image information into groups in accordance with an output of the specific-image-using separation designating means and filing each group of the image information as a block of document data.

With this structure, the specific-image printing sheet is extracted as the separating sheet by detecting the specific image on the sheet by the specific-image-using separation designating means. The image information is separated into groups by the separating sheet, and each group of the image information is designated as a block of document data.

This structure enables the image information to be separated by a specific image which is freely set by a user, and prevents sheets other than the sheet containing the specific image from being used as the separating sheets. Thus, there is no need to provide a special sensor and an increase in the manufacturing cost is avoided. Moreover, the level of mechanical precision required in detecting the separating sheet is eased. It is therefore possible to certainly prevent a faulty recognition of the separating sheet.

Furthermore, the image information processing apparatus having the above-mentioned means enables an inclusion of additional classification control information by including (4) classification controlling means for extracting a classification control sheet inserted before or after the specific-image printing sheet and controlling a grouping of the document data in accordance with classification control information indicated by the classification control sheet.

With the inclusion of the classification control sheet, when the specific image information and the classification control information are together printed on the specific-image printing sheet to be used as the separating sheet, the printing area for the classification control information is expanded by the space of the classification control sheet. It is thus possible to perform grouping control suitable for purposes.

For a fuller understanding of the nature and advantages of the invention, reference should be made to the ensuing detailed description taken in conjunction with the accompanying drawings.

DESCRIPTION OF THE PREFERRED EMBODIMENTS

Figure 12:
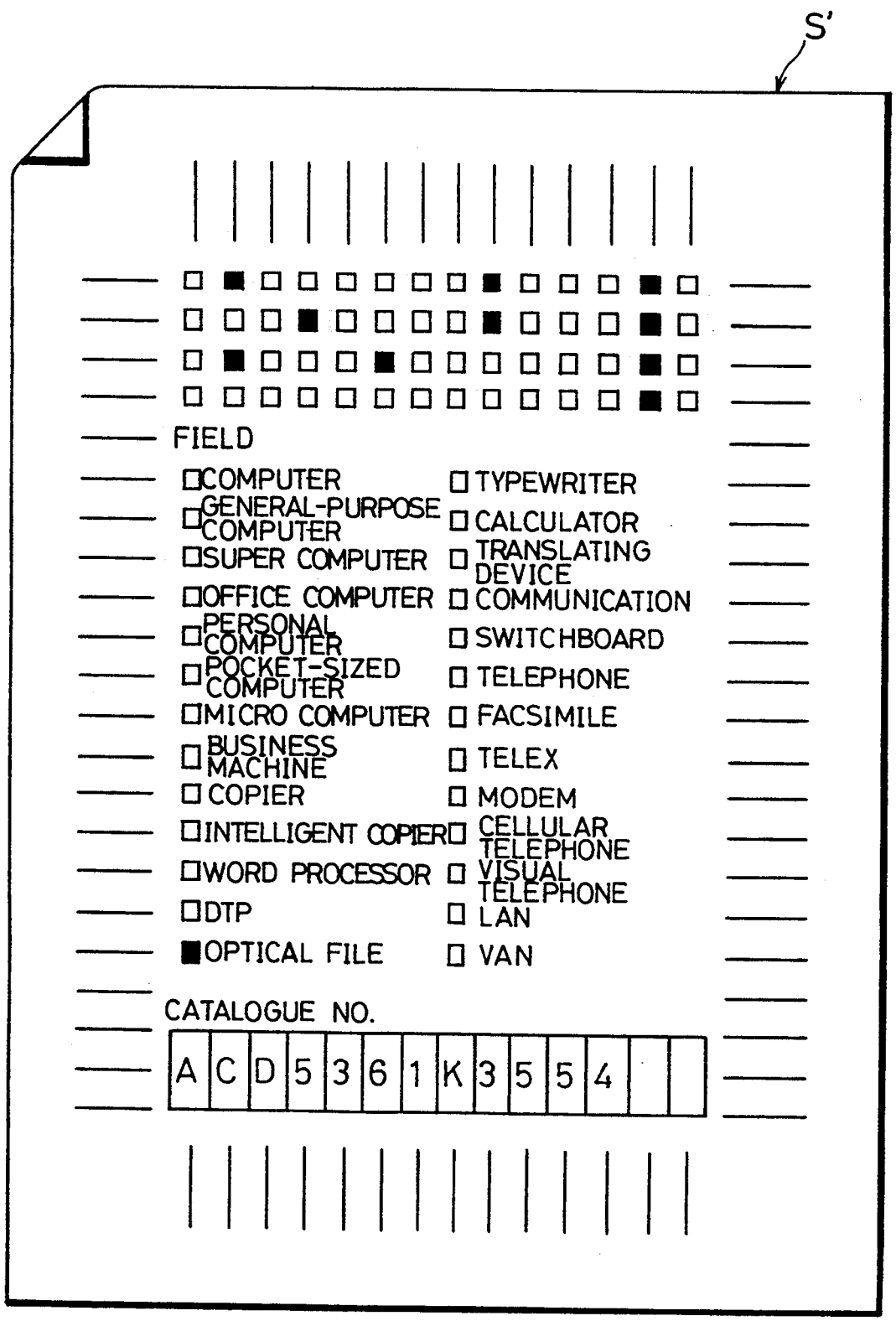
FIG. 12 is a front view of a specific-image printing sheet used as a separating sheet in a conventional image information processing apparatus.
Figure 13:
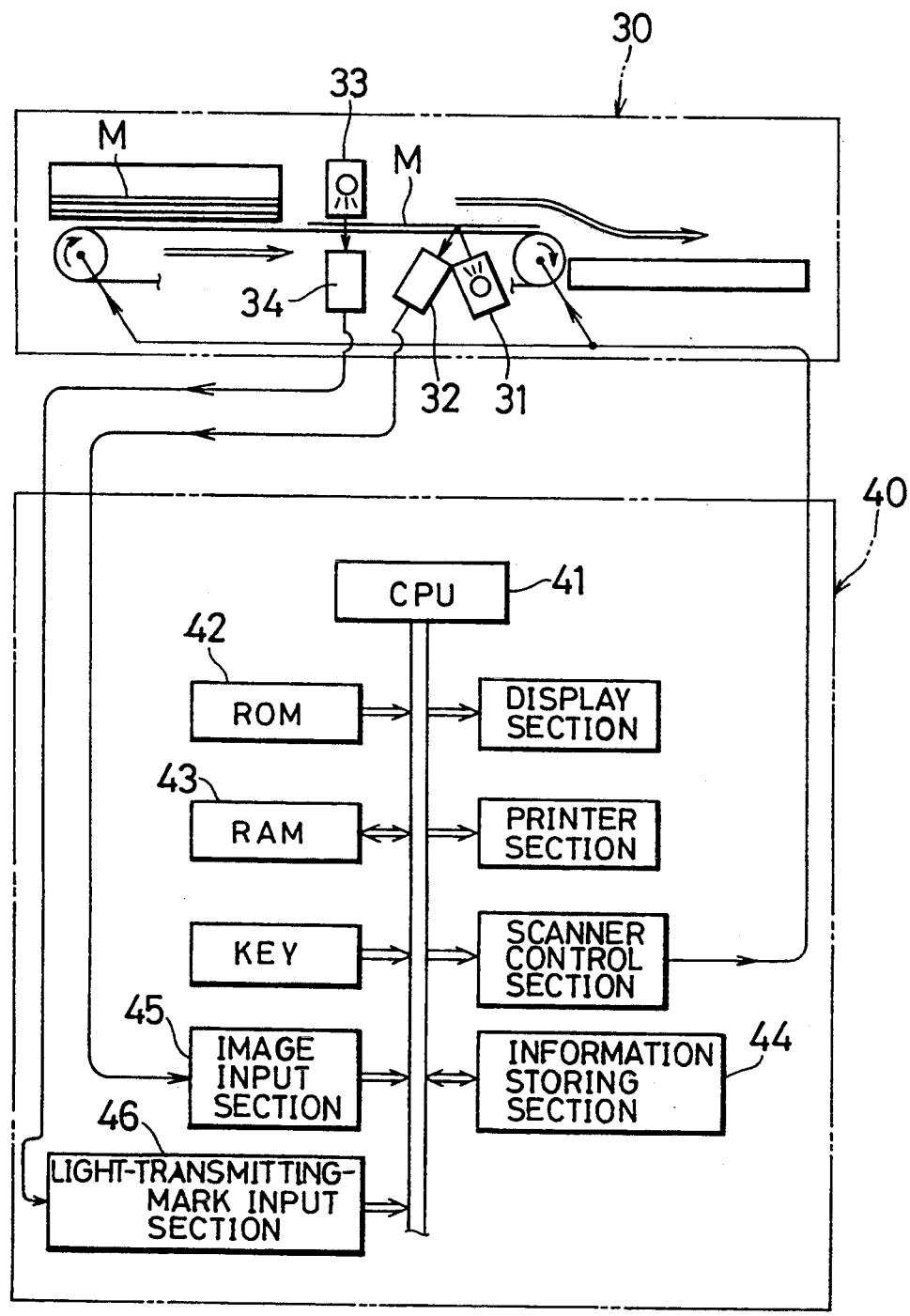
FIG. 13 is a view schematically illustrating a structure of the image information processing apparatus using the special cut sheet.
Figure 14:
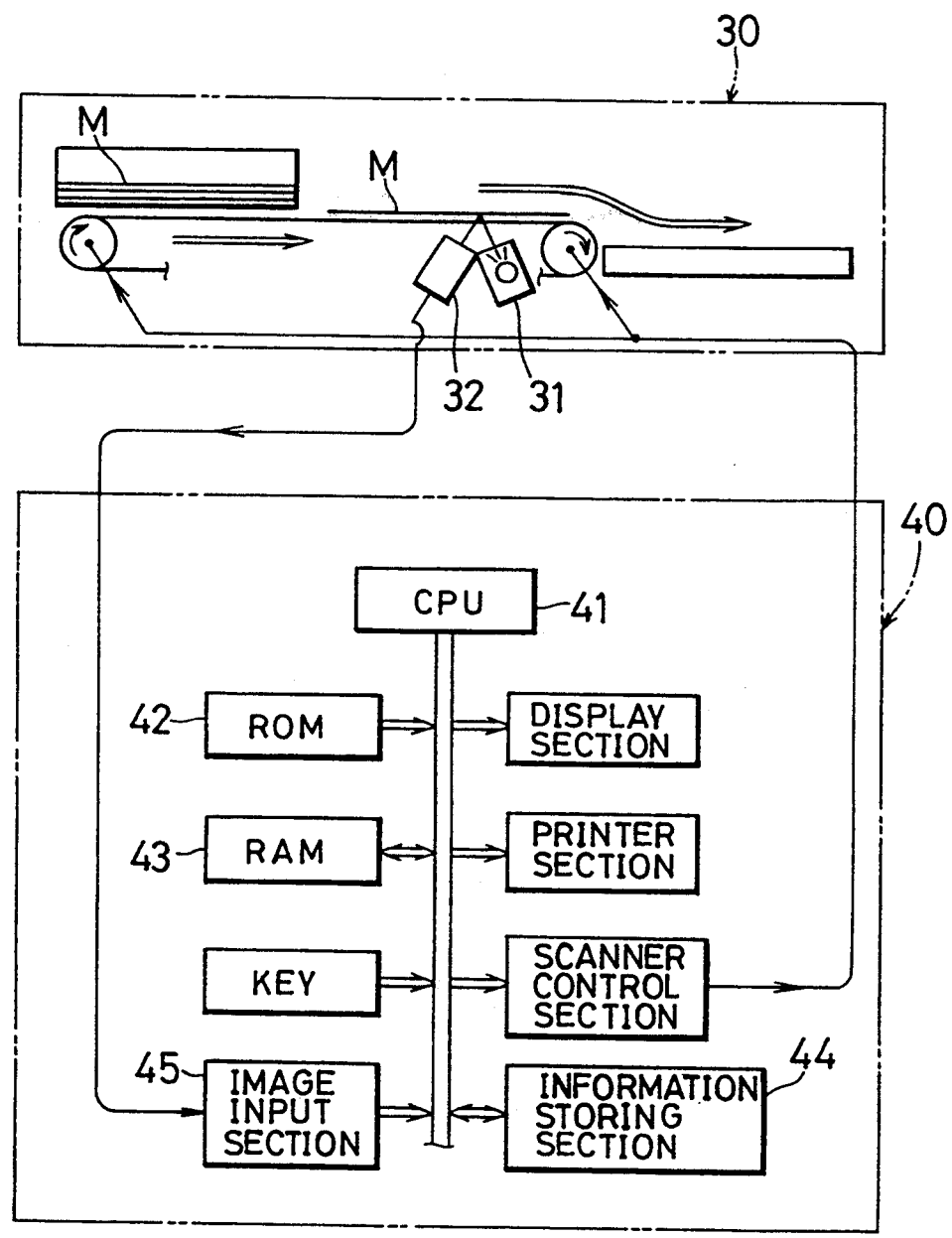
FIG. 14 is a view schematically illustrating a structure of the image information processing apparatus using the specific-image printing sheet.
Figure 15:
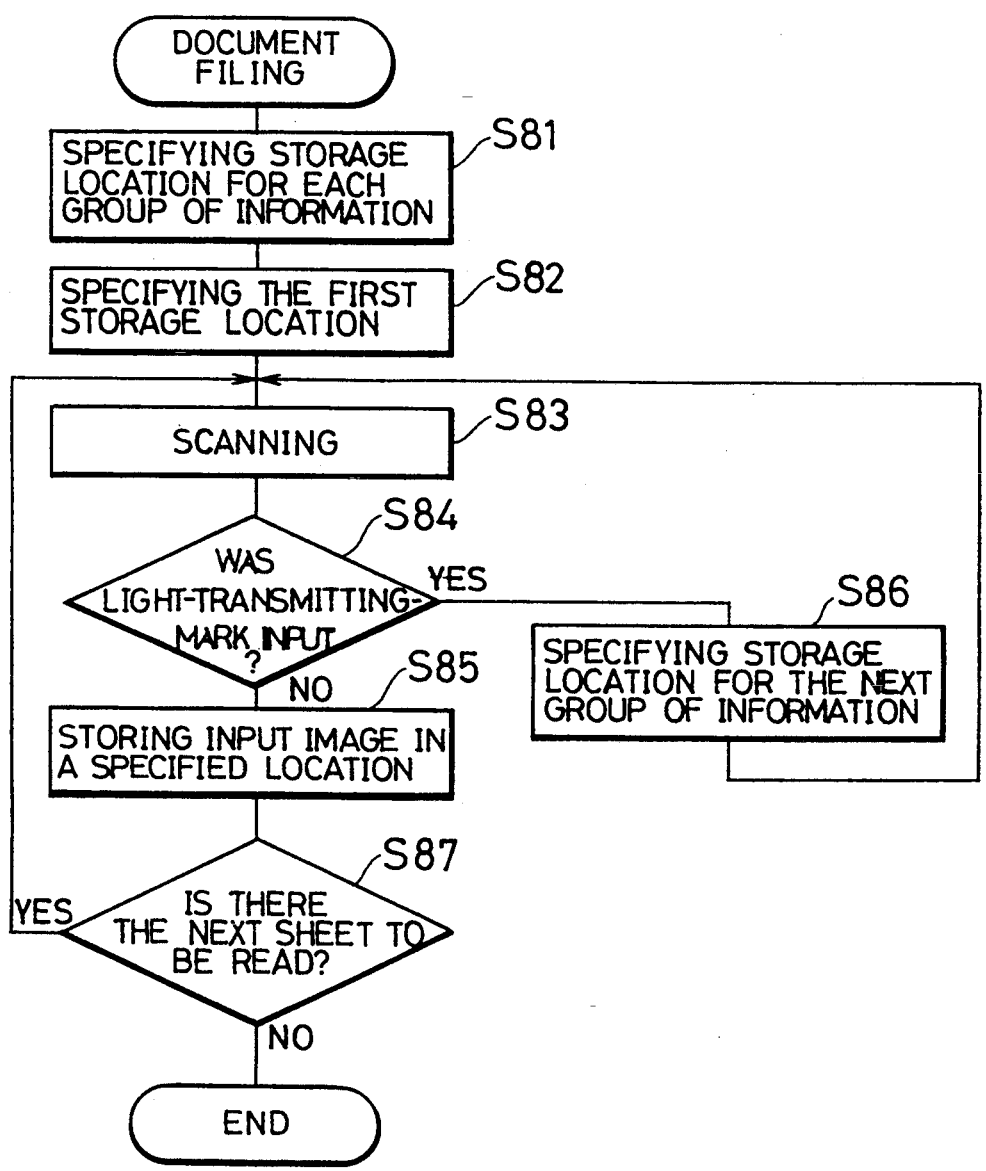
FIG. 15 is a flowchart showing a process of filing a document in the image information processing apparatus using the special cut sheet.
Figure 16:
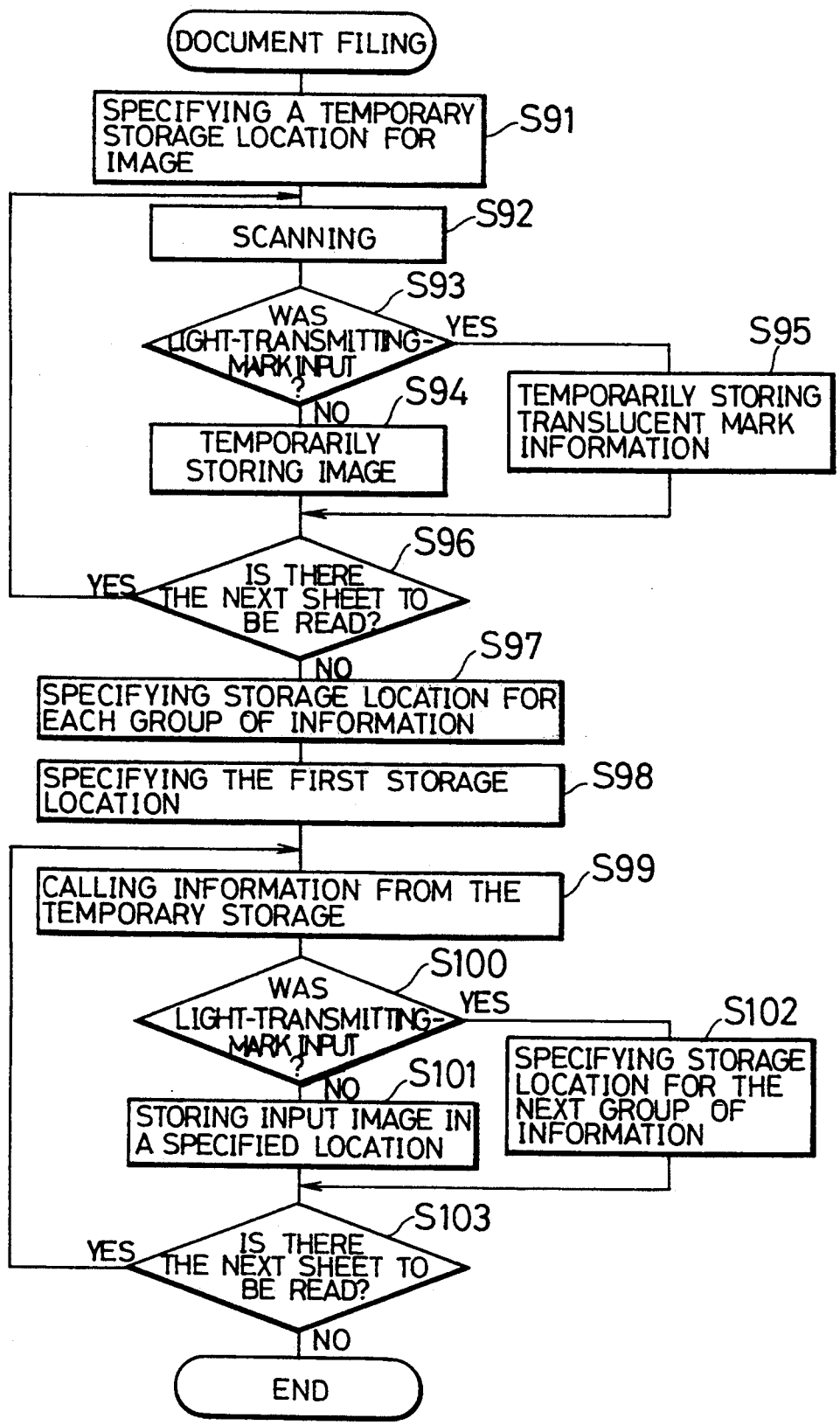
FIG. 16 is a flowchart showing a process of filing a document in the image information processing apparatus wherein a storage location is specified after inputting image information.
Figure 17:
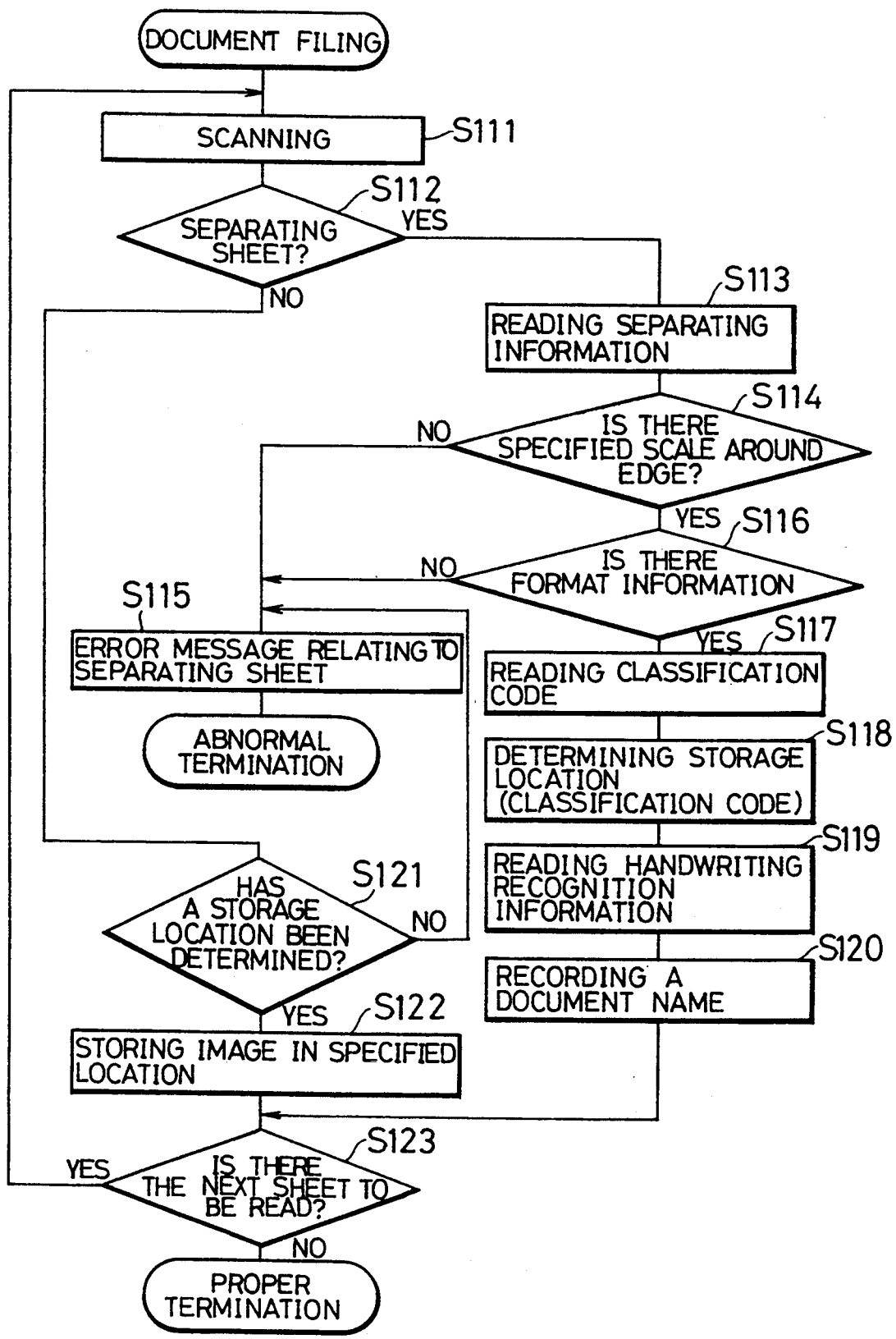
FIG. 17 is a flowchart showing a process of filing a document in the image information processing apparatus using the specific-image printing sheet.

The following description discusses one embodiment of the present invention with reference to FIGS. 1 to 10. For the sake of convenience, the above-mentioned FIG. 12 is also used to explain this embodiment.

Figure 1:
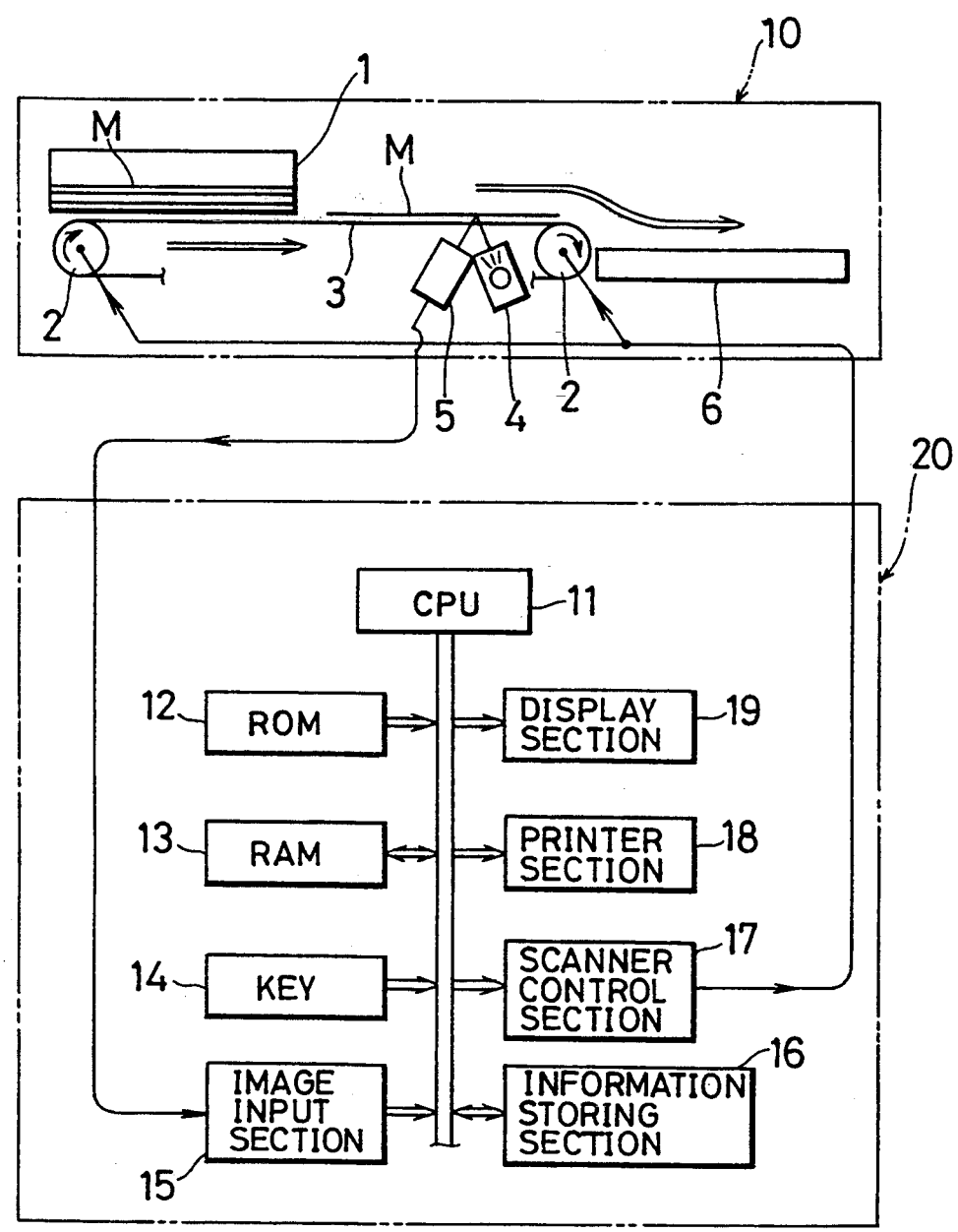
FIG. 1 is a depiction illustrating an example of the structure of an information processing apparatus of the present invention.

As illustrated in FIG. 1, an image information processing apparatus of this embodiment has a scanner device (inputting means) 10 and a filing device (memory means) 20. The images on documents M are read as image information by the scanner device 10, and pieces of the image information forming a group are filed as a block of document data in the filing device 20.

The scanner device 10 includes a document platen 1, a pair of right and left transport rollers 2, a transport belt 3, a light emitting section 4, a light receiving section 5, and a tray 6 for output sheets.

A plurality of documents M are piled on the document platen 1. The transport belt 3 is wrapped round the transport rollers 2 and moved to convey the documents M one by one sequentially from the document platen 1 toward the tray 6 as the transport rollers 2 are driven. The scanner device 10 reads the image on a document M as image information by irradiating reading-use light from the light emit section 4 on the document M transported by the transport belt 3 and receiving light reflected from the document M by the light receiving section 5. After reading the image, the document M is transported to the tray 6 by the transport belt 3. The light receiving section 5 is connected to an image input section 15, to be described later, and the image information read from the document M is sent to the image input section 15 from the light receiving section 5. The transport rollers 2 as the driving source of the transport belt 3 are connected to a scanner controlling section 17 to be described later. The transport rollers 2 are controlled by a control signal from the scanner controlling section 17. Namely, the transporting of the document M in the scanner device 10 is controlled by the control signal.

The filing device 20 has a CPU (Central Processing Unit) 11 which executes a program by controlling the operation of each component member of the device 20. The CPU 11 is connected to ROM (Read Only Memory) 12, RAM (Random Access Memory) 13, a key 14, the image input section 15, an information storing section 16, the scanner controlling section 17, a printer section 18, and a display section 19. The key 14 and the display section 19 forms storage location specifying means.

The ROM 12 stores various control programs to be described later. The RAM 13 is used as a work area. The key 14 is used by the user to input information such as command data. The image input section 15 inputs the image information read by the scanner device 10 to the filing device 20. The information storing section 16 stores the image information output by the image input section 15 as document data such as characters and lines. The scanner controlling section 17 controls the transporting of the document M in the scanner device 10 according to the input timing of the image information to the image input section 15. The printer section 18 prints the document data. The display section 19 displays the document data.

The ROM 12 stores a document storing routine, a monochrome-sheet-using separation designating routine, a specific-image-using separation designating routine, and a classification controlling routine as the control programs. The ROM 12 constitutes monochrome-sheet-using separation designating means, specific-image-using separation designating means and classification controlling means of the present invention.

The document storing routine is a program which sequentially stores the image information input by the image input section 15 as document data in the information storing section 16. The monochrome-sheet-using separation designating routine is a program which distinguishes a monochrome, for example, entirely black or white separating sheet from the documents M and specifies documents M after the separating sheet as the next group of documents. The specific-image-using separation designating routine is a program which distinguishes a separating sheet containing a specific image from documents M, and specifies documents M after the separating sheet as the next group of documents. The classification controlling routine is a program which controls the grouping during document filing according to the classification control information on a classification control sheet which is inserted before or after the separating sheet.

Figure 2:
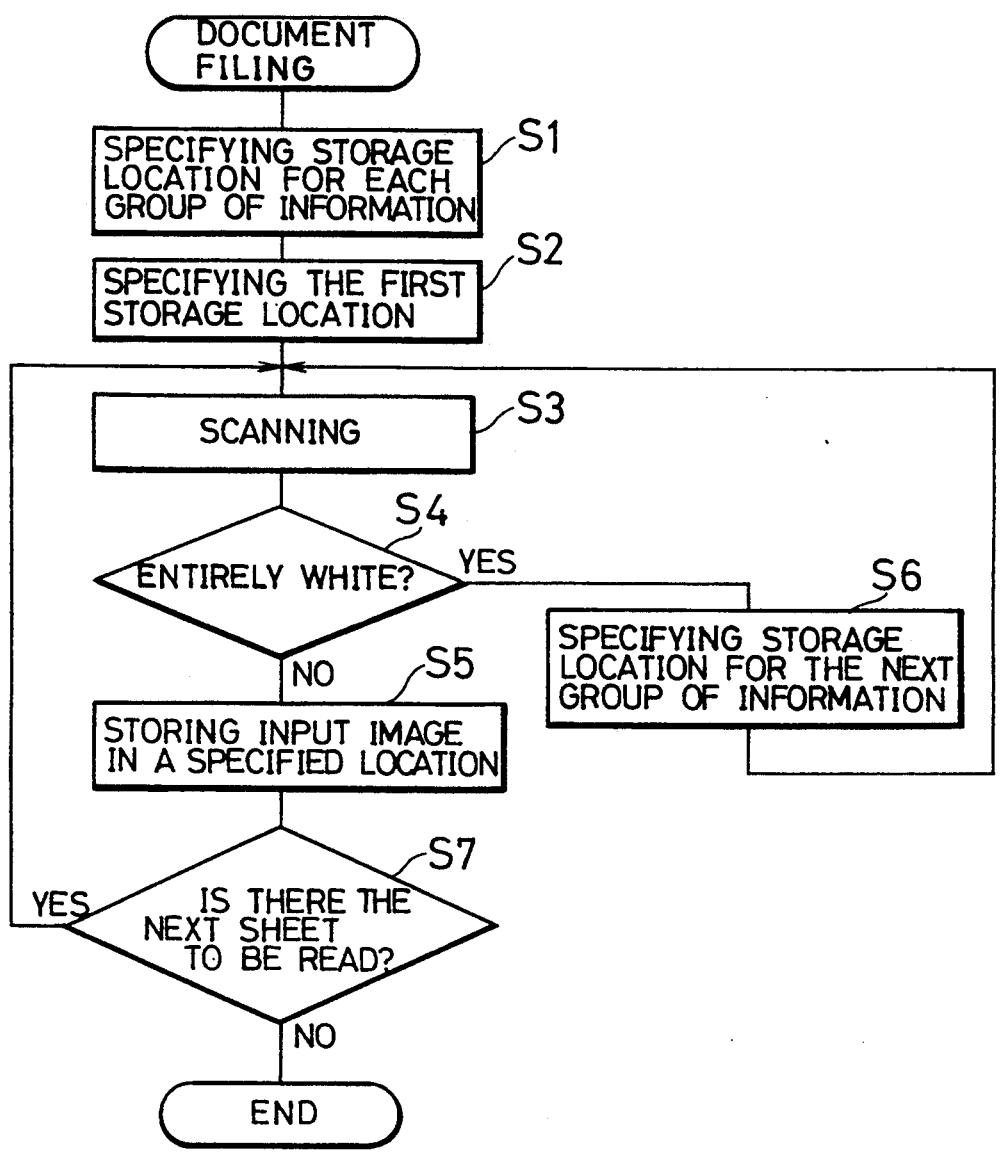
FIG. 2 is a flowchart showing a process of filing a document according to a monochrome-sheet-using separation designating routine in a ROM in the image information processing apparatus.
Figure 3:
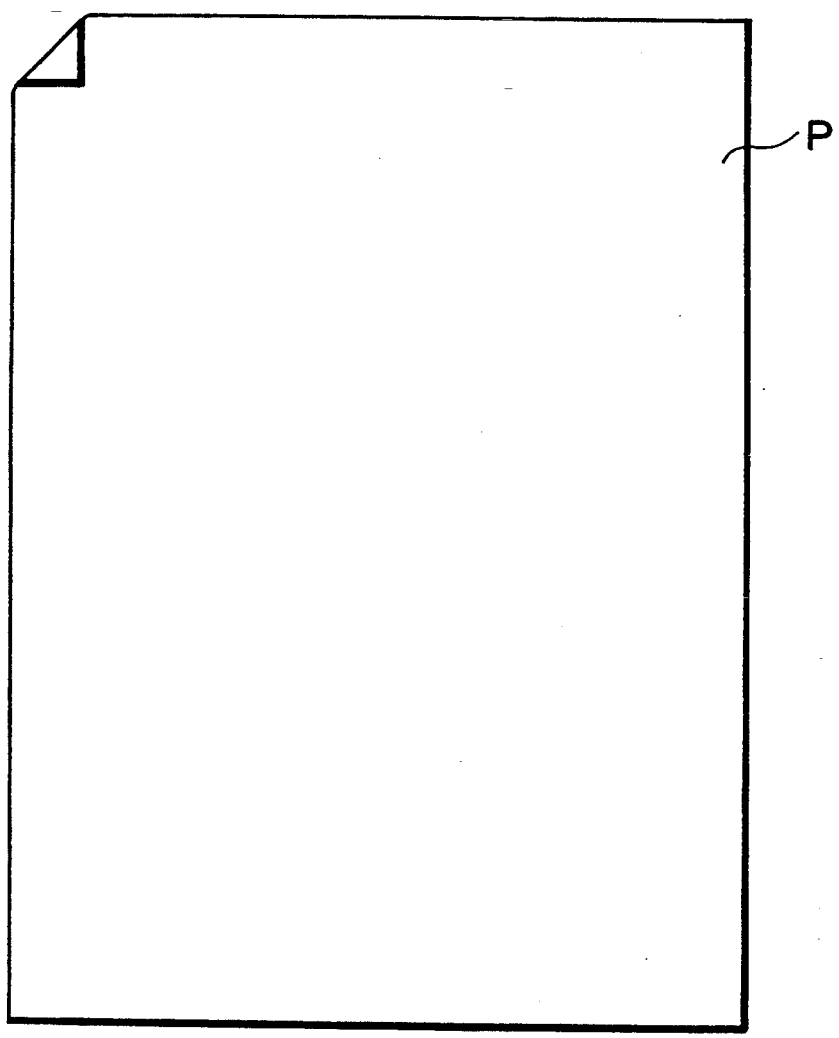
FIG. 3 is a front view of an entirely white monochrome sheet used as a separating sheet in the filing process of FIG. 2.

The process of filing documents by the monochrome-sheet-using separation designating routine programmed in the ROM 12 of this image information processing apparatus is discussed below with reference to the flowchart of FIG. 2. In this filing process, a monochrome sheet P of entirely white color shown in FIG. 3 is used as the separating sheet. The monochrome sheet P is inserted into a plurality of documents M on the document platen 1 to indicate the start or end of each group of documents M.

First, when inputting a plurality of documents M, a storage location in the image storing section 16 is specified beforehand for each group of documents M using the key 14 and the display section 19 (step 1). Then, the first storage location in the information storing section 16 is specified for the image information of a sheet (step 2). The scanner device 10 scans the sheet, and the image information read by the scanner device 10 is input into the image input section 15 of the filing device 20 (step 3).

Next, whether the image information thus input into the image input section 15 is entirely white or not, i.e., whether the sheet is a monochrome sheet P or a document M is judged (step 4). If the sheet is judged to be a document M in step 4, the image information is stored in the specified location in the information storing section 16 (step 5), and the operation moves to step 7 to be discussed later. On the other hand, if the sheet is judged the monochrome sheet P, the operation proceeds to step 6. In step 6, a storage location in the information storing section 16 where the next group of image information is to be stored is specified, and then the operation returns to step 3.

In step 7, whether there is a next sheet to be read or not is judged. The operation returns to step 3 if there is a next sheet to be read, while the filing process is complete if there is no sheet to be read next.

Figure 4:
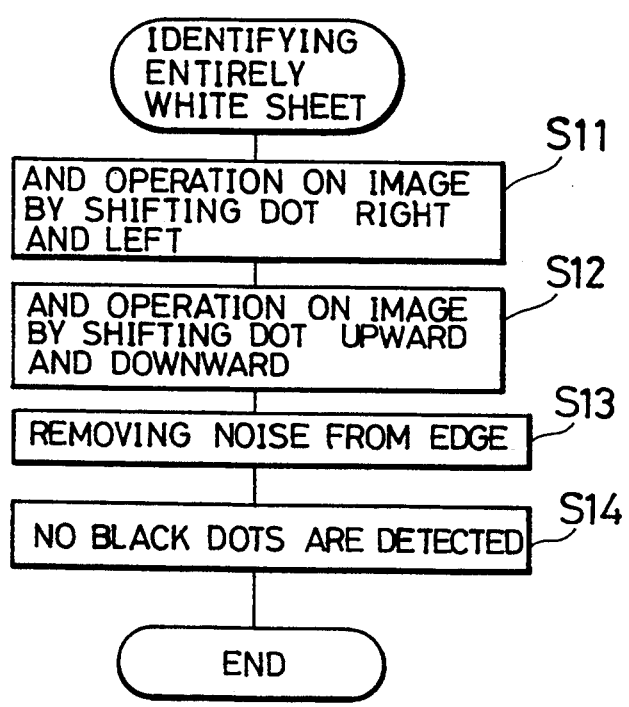
FIG. 4 is a flowchart showing a process of judging the entirely white monochrome sheet in the filing process of FIG. 2.
Figure 5:
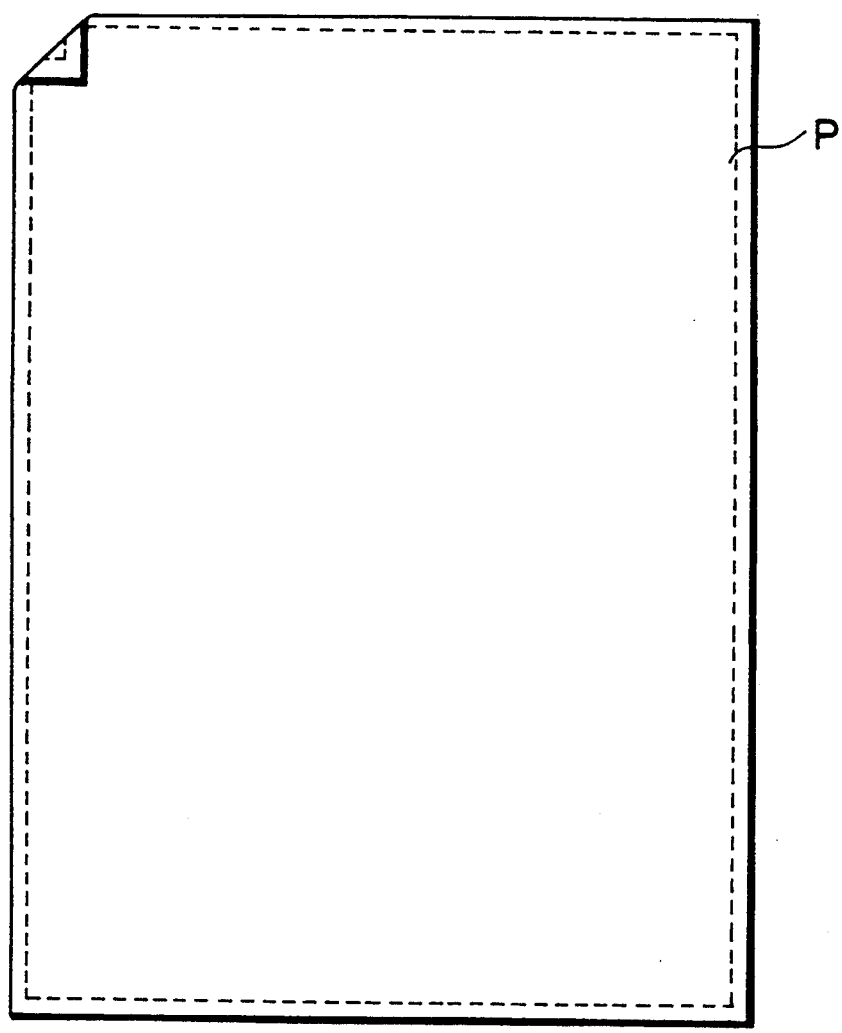
FIG. 5 is a front view of the monochrome sheet and explains an input noise removing area thereof.

The following description discusses the process of identifying the monochrome sheet P in step 4 of the filing process with reference to the flowchart of FIG. 4.

First, an increase in the number of dots caused by horizontal input noise is removed by performing an AND operation on the image information input into the image input section 15 by shifting a dot right and left (step 11). An increase in the number of dots caused by vertical input noise is removed by performing an AND operation on the image information by shifting the dot upward and downward (step 12).

In step 13, input noise in the sheet edge is removed. Image information input by the image processing is judged to contain, for example, no black information, i.e., dots (step 14). Consequently, the sheet is judged the monochrome sheet P. The sheet edge means an area outside the broken line on the sheet P shown in FIG. 5, and it is not usually used for writing information.

Figure 6:
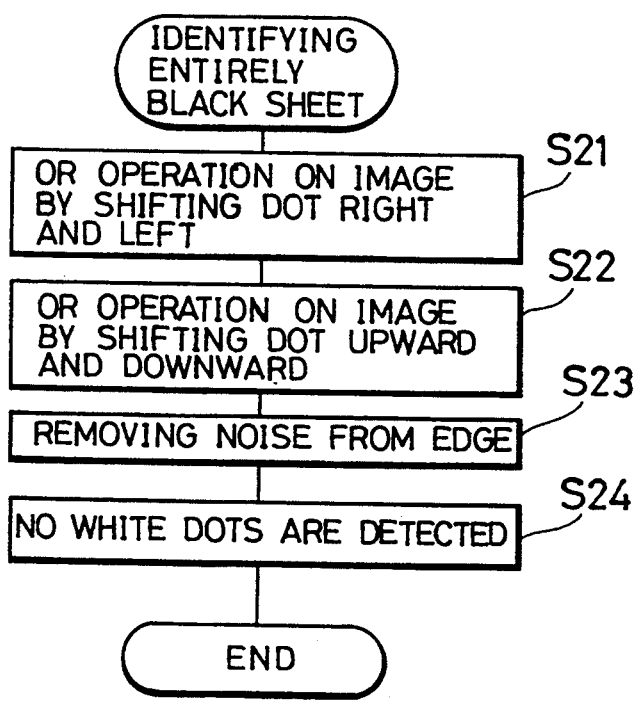
FIG. 6 is a flowchart showing a process of judging an entirely black monochrome sheet used as a separating sheet in the filing process of FIG. 2.
Figure 7:
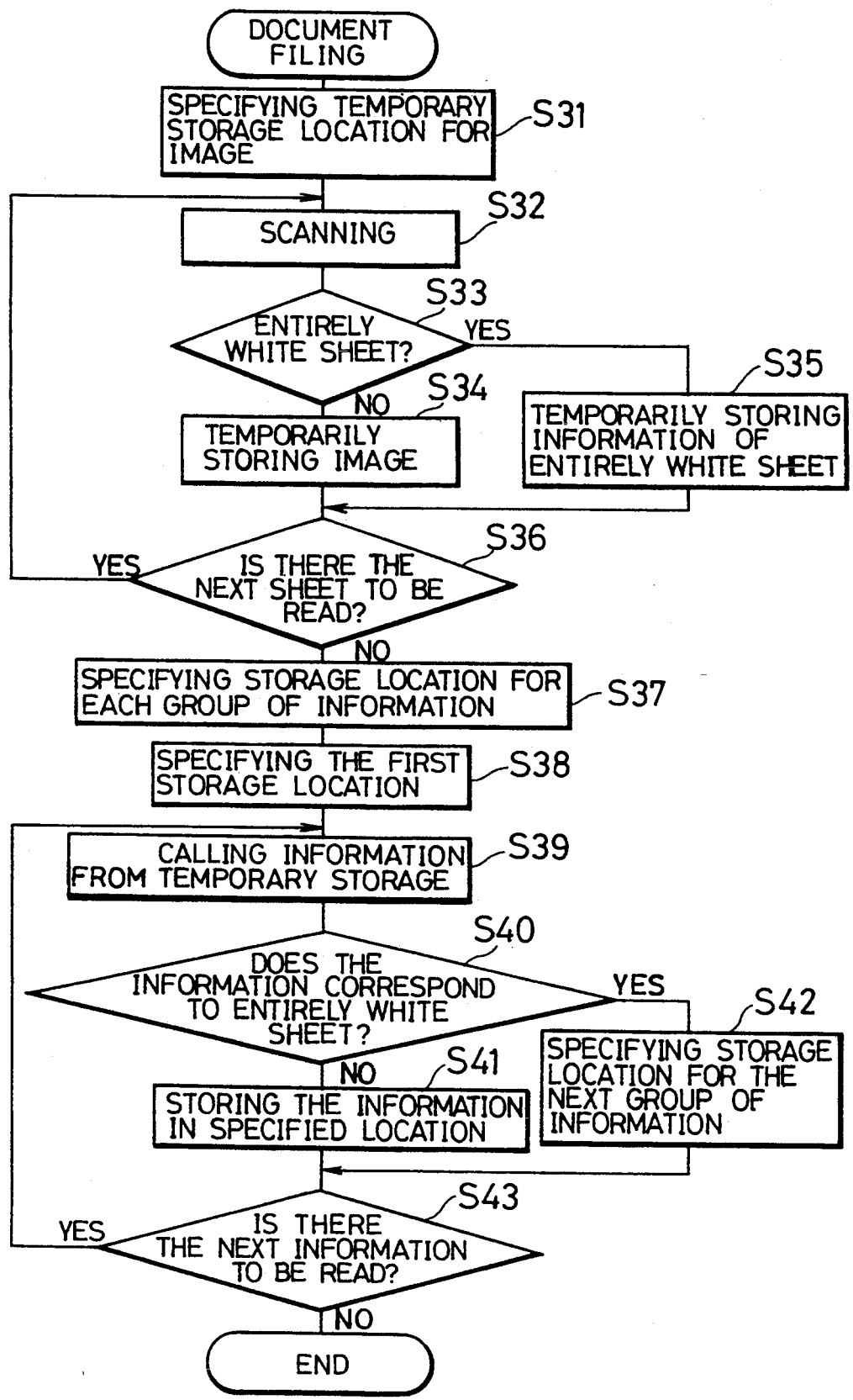
FIG. 7 is a flowchart showing a process of specifying a storage location after inputting image information in filing document.

The following description discusses the sheet identifying process in document filing when the entirely black monochrome sheet is used as the separating sheet with reference to the flowchart of FIG. 6.

First, an increase in the number of dots caused by horizontal input noise is removed by performing an OR operation on the image information input into the image input section 15 by shifting the dot right and left (step 21). An increase in the number of dots caused by vertical input noise is removed by performing an OR operation on the image information by shifting the dot upward and downward (step 22).

In step 23, input noise in the sheet edge is removed. Image information thus input by the image processing is judged to contain, for example, no white information, i.e., dot (step 24). Consequently, the sheet is judged to be entirely black.

When judging whether the sheet is entirely white or black, an AND or OR operation may be performed on the whole areas of the sheet edge, if necessary, to examine not only upper and lower ends and right and left sides of the sheet but also the right and left sides of the upper and lower ends. In the identifying processes of FIGS. 4 and 6, although the entirely white and black sheets are mentioned, a red, green or blue separating sheet may also be used. In this case, not only judging whether the sheet is black or white, but also whole colors of the sheet are identified.

In such a filing process, a storage location in the information storing section 16 is specified in advance for each group of documents. The storage location may also be specified after inputting the image information. The following description discusses the filing process when specifying storage locations after inputting image information with reference to the flowchart of FIG. 7. Here, the entirely white monochrome sheet P is used as a separating sheet.

First, a temporary storage location in the image storing section 16 is specified for the image information (step 31), and the image information read by the scanner device 10 is input to the image input section 15 of the filing device 20 (step 32). Then, whether the image information is entirely white or not, i.e. whether the sheet is a monochrome sheet P or a document M is judged (step 33). In step 33, if the sheet is judged to be the document M, the image information thus input is temporarily stored in the specified location in the information storing section 16 (step 34), and the operation proceeds to step 36 to be discussed later. On the other hand, if the sheet is judged to be the monochrome sheet P, the operation moves to step 35. In step 35, the separation designating information of the monochrome sheet P is temporarily stored, and then the operation proceeds to step 36.

Step 36 judges if there is a next sheet to be read. If so, the operation returns to step 32. If not, permanent storage locations in the information storing section 16 are specified for the respective groups of the documents using the key 14 and the display section 19 (step 37). Then, the first storage location in the information storing section 16 is specified (step 38).

The image information stored in the temporary storage locations is called sequentially (step 39), and whether each image information called is the separation designating information of the monochrome sheet P or not is judged (step 40). In step 40, if the image information is not judged to be the separation designating information, the image information is permanently stored in the specified location in the information storing section 16 (step 41), and the operation proceeds to step 43 to be described later. On the other hand, if the image information is judged to be the separation designating information, the next storage location in the information storing section 16 is specified (step 42), and the operation proceeds to step 43.

Step 43 judges if there is a next information to be processed in the respective storage locations in the information storing section 16. If any, the operation again returns to step 39. If there is no information to be processed next, the filing process is complete.

When the image information first input is separation designating information, step 42 is ignored if necessary, and the filing process is progressed according to the condition of the first storage location. In this case, it is possible to distinguish the first storage location by using color other than white, or to separate the documents M into groups of different levels (main class, subclass, or detailed class) by using separating sheets of different colors and judge to which group the image information belong.

Next, the process of filing document using the specific-image-using separation designating routine programmed in the ROM 12 is discussed.

Figure 8:
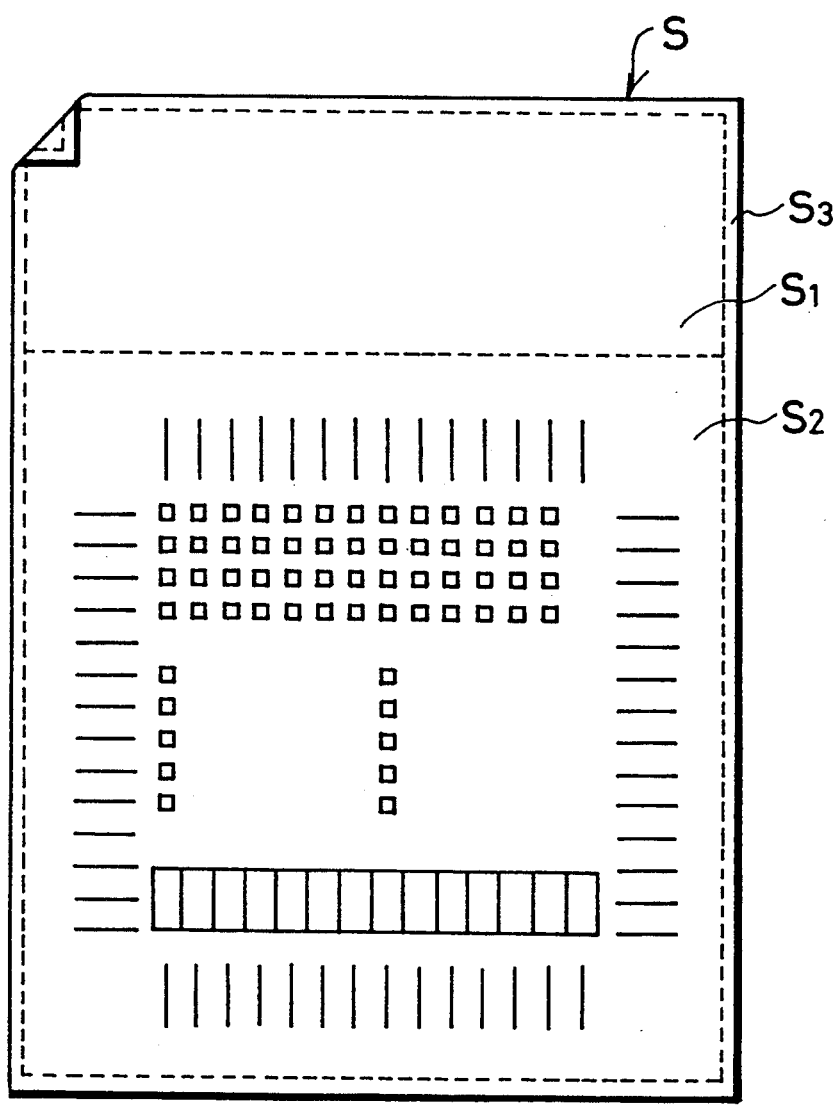
FIG. 8 is a front view of a specific-image printing sheet used as a separating sheet in the filing process of FIG. 7.

With the process using the specific-image-using separation designating routine, a specific-image printing sheet S shown in FIG. 8 is used as a separating sheet. The specific-image printing sheet S has a specific image area $S_1$, a data input area $S_2$, and a noise removing area $S_3$.

In the specific image area $S_1$, in order to indicate the specific-image printing sheet S as class information used in the specific-image-using separation designating routine, a specific image such as a corporation mark is printed. The mark is freely input by a user. If the mark is read by the scanner device 10 before grouping, the input mark is recorded as a basic data of the specific image in the filing device 20. The filing device 20 is capable of printing the specific-image printing sheet S having the mark recorded in the specific image area $S_1$. With such a specific-image printing sheet S having the mark thereon, it is possible to compare the recorded basic data with a mark extracted from the input image information when performing a grouping operation.

The data input area $S_2$ is provided to enable the inputting of the class information of a document in a reduced size. In the data input area $S_2$, a storage location for the input image information is specified by using format information, classification code or a handwritten document name. The format information indicates the type of a separating sheet and a mode of separation. The classification code indicates an area where such image information is to be arranged and stored. The document name means the name of image information to be filed.

The noise removing area $S_3$ is provided at the edge of the specific-image printing sheet S for removing input noise in a forced manner.

Figure 9:
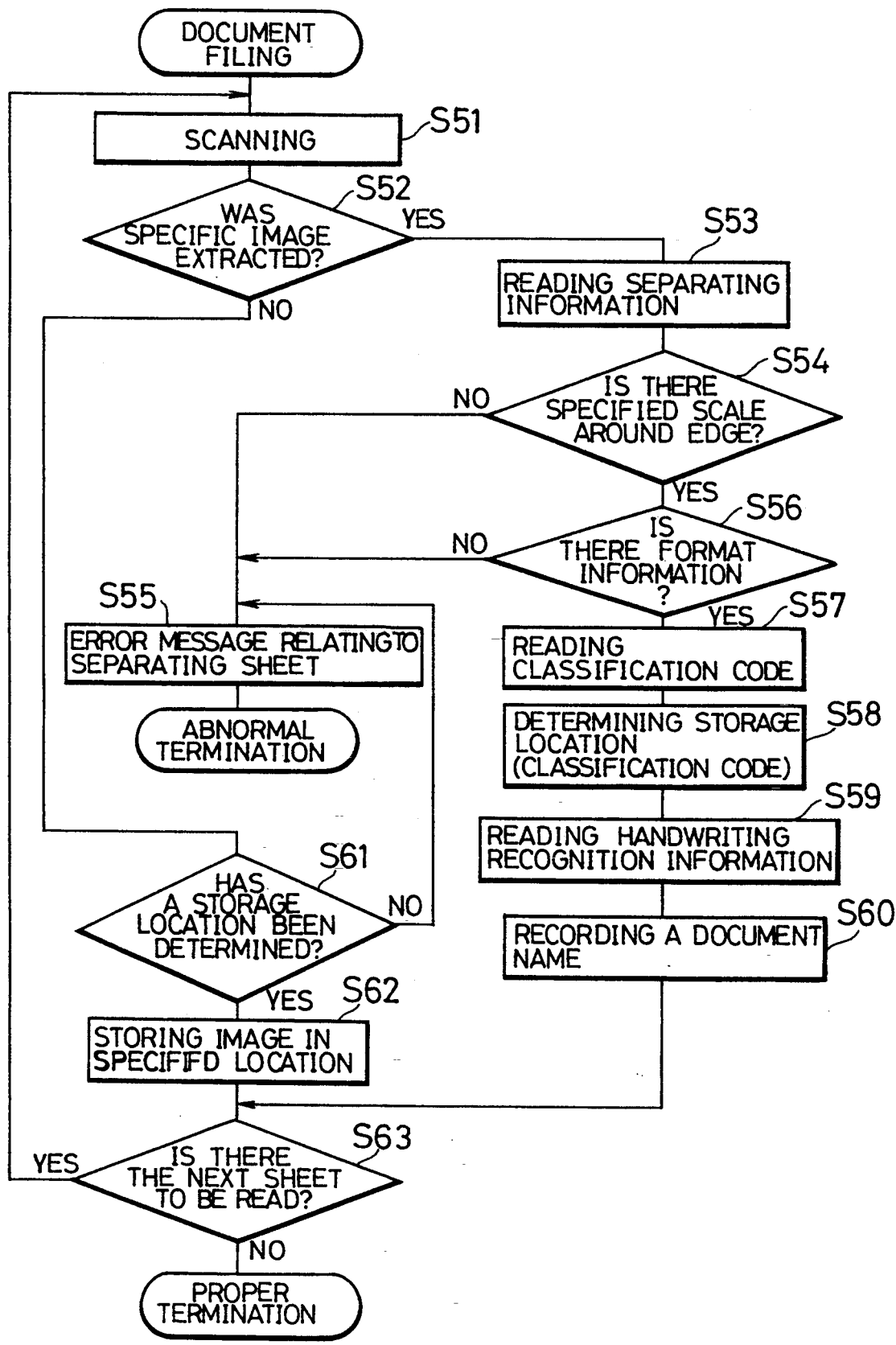
FIG. 9 is a flowchart showing a process of filing a document according to a specific-image-using separation designating routine in the ROM.

The process of filing a document including an extraction of specific image information is discussed below with reference to the flowchart of FIG. 9. The specific-image printing sheet S is placed in advance before the first page of each group of documents M piled on the document platen 1.

First, the image information read by the scanner device 10 is input to the image input section 15 of the filing device 20 (step 51). Then, whether the specific image information is extracted from the specific image area $S_1$ is judged (step 52).

In step 52, if the specific image information is extracted, i.e., if the sheet is to be judged the specific-image printing sheet S, the operation moves to step 53. In step 53, the class information (classification control information) is read out, and whether there is a scale around the data input area $S_2$ is judged (step 54). If there is no scale, the operation moves to step 55, an error message relating to the separating sheet is displayed, and the filing process designed for the erroneous condition is complete.

In step 54, when the scale is detected, whether the format information is contained or not is judged by an optical mark reading system (step 56). If no format information is found, the error message is displayed and the process is complete like the above. On the other hand, if the format information is found in step 56, a classification code is read out from the specific-image printing sheet S by the optical mark reading system (step 57), and a location where the image information of the document M is to be stored is determined according to the classification code (step 58). Next, handwriting recognition information is read out from the specific-image printing sheet S by an optical character reading system (step 59), and the document name is recorded (step 60). The operation then proceeds to step 63 to be discussed later.

Meanwhile, when the specific image information is not extracted in step 52, i.e., when the sheet is the document M, the operation moves to step 61 and whether a location where the image information of the document M is to be stored has been determined or not is judged. If the location has not been determined, the operation returns to step 55. On the other hand, if the location has been determined, the image information is stored in the location specified by the specific-image printing sheet (step 62) and then if there is a sheet to be read next is judged (step 63). If any, the operation returns to step 51. If there is no sheet to be read, the above-mentioned filing process to be executed under the normal condition is complete.

The following description discusses the process of extracting the classification control information of the classification control sheet using the classification controlling routine programmed in the ROM 12 in document filing. As illustrated in FIG. 12, a specific-image printing sheet S' in which the classification control information is recorded in a reduced size is used as the classification control sheet. The specific-image printing sheet S' is inserted in advance before or after the separating sheet inserted into the documents M. For the separating sheet, for example, either the entirely white monochrome sheet P or the specific-image printing sheet S having the specific image printed thereon is used. If the monochrome sheet P is used as the separating sheet, the storage location for the image information is automatically specified. Meanwhile, if the specific-image printing sheet S is used as the separating sheet, the data input area $S_2$ is expanded by the space of the classification control sheet.

The process of extracting the classification control information is discussed below with reference to the flowchart of FIG. 10.

First, whether the separating sheet is extracted or not is detected (step 71). If the separating sheet is not extracted in step 71, the process of extracting the classification control information is complete. On the other hand, when the separating sheet is extracted, if there is a classification control sheet before the separating sheet or not is detected (step 72). If there is the classification control sheet before a separating sheet, the operation proceeds to step 77 to be discussed later. When the classification control sheet is not placed before the separating sheet, whether the classification control sheet is inserted after the separating sheet or not is judged (step 73).

If there is the classification control sheet after the separating sheet, the operation moves from step 73 to step 77 to be described later. If there is no classification control sheet after the separating sheet, i.e., if there is no classification control sheet before nor after the separating sheet, the operation proceeds to step 74 and a classification control information is requested, if necessary.

Next, whether there is a classification control information or not is judged (step 75). If any, the operation moves to step 78 to be described later. And, if not, a process to be performed after classification is carried out to allow the addition of classification control information by means of a sheet other than the separating sheet (step 76). Then, the above-mentioned process is complete.

As described above, if the classification control sheet is detected before or after the separating sheet, the operation proceeds to step 77 and the classification control information is read out from the classification control sheet. Then, blocks separated by the separating sheet are classified according to the classification control information (step 78) and the process of extracting the classification control information is complete.

Figure 10:
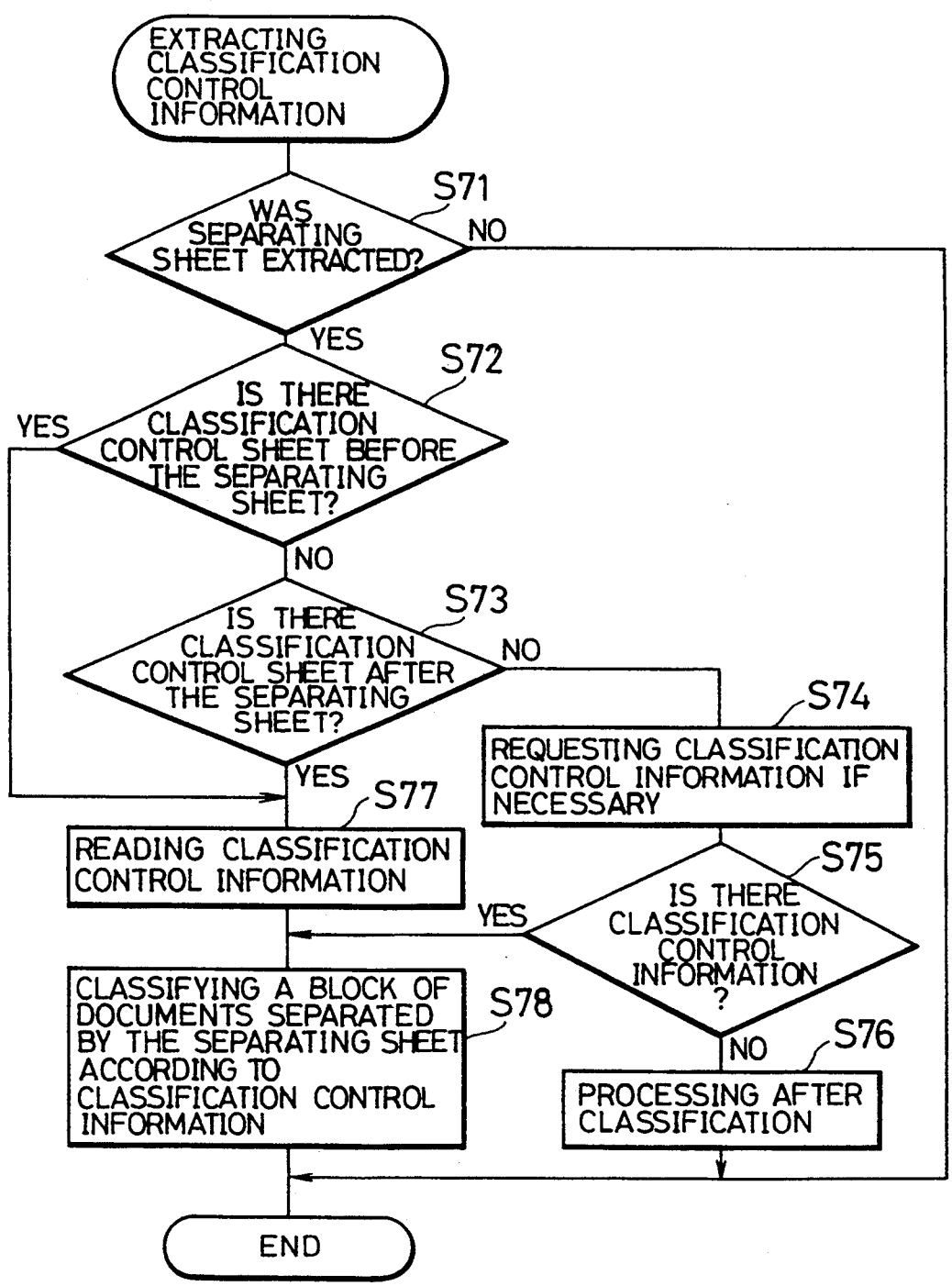
FIG. 10 is a flowchart showing a process of extracting classification control information according to a classification controlling routine in the ROM.
Figure 11:
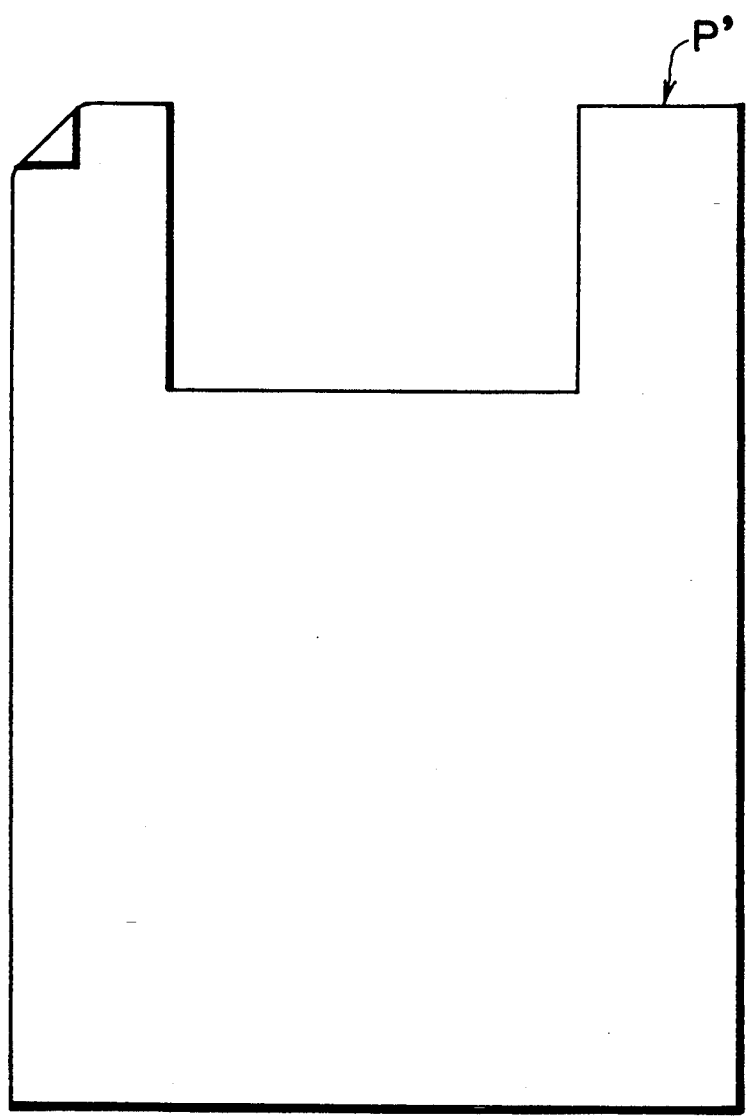
FIG. 11 is a front view of a special cut sheet used as a separating sheet in a conventional image information processing apparatus.

Although not shown in the flowchart of FIG. 10, in the process of extracting the classification control information, if a plurality of classification control sheets are used, it is possible to further separate the classified documents M into more detailed categories by establishing rules and to add more detailed classification control information.

As described above, this image information processing apparatus includes the scanner device 10 for reading the documents M as the image information, and the filing device 20 for filing pieces of the image information read by the scanner device 10 forming a group as a block of document data. The filing device 20 includes the ROM 12 in which the monochrome-sheet-using separation designating routine, the specific-image-using separation designating routine and the classification controlling routine are programmed.

With the monochrome-sheet-using separation designating routine, whole colors in a specified area of a sheet are identified to extract the monochrome sheet, for example, the entirely black or white sheet as the separating sheet. The document data is separated according to the result. With this structure, it is possible to use a plain monochrome sheet such as an ordinary sheet having an entirely white color as a separating sheet for grouping the document data. Moreover, there is no need to include a light emitting section and a light receiving section for judging the separating sheet in addition to the document reading system, resulting in a reduction in the manufacturing cost. Furthermore, since the criteria for judging the separating sheet are eased, the accuracy of recognizing a sheet is improved.

With the specific-image-using separation designating routine, the specific-image printing sheet is extracted as a separating sheet by detecting the specific image printed on a sheet. A plurality of documents are separated into groups by the separating sheet, and the document data is grouped. The image information is divided by a specific image which is freely set by a user. With this structure, it is possible to prevent sheets other than the sheet containing the specific image from being used as the separating sheets, and therefore the level of the mechanical precision required for detecting the separating sheet is lowered. Moreover, since a conventional separating sheet has a shape shown in FIG. 12, in order to avoid faulty recognition, a highly accurate judgement is required when comparing the normal image information sheet and the separating sheet.

With the classification controlling routine, the classification control sheet which is inserted either before or after the separating sheet is extracted, and the classification of the document data is performed according to the classification control information on the classification control sheet. Therefore, in the document filing using a monochrome separating sheet such as the entirely white monochrome sheet P, a location where the image information is to be stored is automatically specified. Additionally, with the document filling using the specific-image printing sheet S, it is possible to expand the data input area $S_2$ by the space of the classification control sheet.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image information processing apparatus comprising:
    inputting means for sequentially inputting a plurality of documents as image information;
    detecting means for detecting a separating sheet with a white specified area, the separating sheet being inserted between the documents;
    separation designating means for designating a grouping of the image information according to a position of the separating sheet inserted; and
    memory means for separating the image information into groups in accordance with an output of said separation designating means and filing each of said group of the image information as a block of document data,
    wherein said detecting means carries out a logical AND between image data of said specified area of the separating sheet and data which is obtained by shifting the image data by an amount of one dot in a lateral direction, and detecting the separating sheet based on first data represented by the logical AND so as to eliminate noise from the image information.

2. The image information processing apparatus according to claim 1,
    wherein said detecting means carries out a logical AND between the first data and data which is obtained by shifting the image data by an amount of one dot in a vertical direction, and detecting the separating sheet based on second data represented by the logical AND so as to eliminate noise from the image information.

3. The image information processing apparatus according to claim 2,
    wherein said detecting means determines that a sheet having no data representing a black dot in the second data is the separating sheet.

4. The image information processing apparatus according to claim 3,
    wherein the specified area is an entire area of a sheet except a peripheral area thereof.

5. The image information processing apparatus according to claim 2, further comprising storage location designating means for specifying a storage location for each of said groups of the image information.

6. The image information processing apparatus according to claim 2, further comprising classification controlling means for extracting a classification control sheet inserted before or after the separating sheet and controlling a grouping of the document data in accordance with classification control information indicated by the classification control sheet.

7. The image information processing apparatus according to claim 6 wherein a plurality of classification control sheets are inserted before or after the separating sheet and said classification controlling means further controls the grouping of the document data in accordance with a plurality of detailed categories.

8. An image information processing apparatus comprising:
    inputting means for sequentially inputting a plurality of documents as image information;
    detecting means for detecting a separating sheet with a black specified area, the separating sheet being inserted between the documents;
    separation designating means for designating a grouping of the image information according to a position of the separating sheet inserted; and
    memory means for separating the image information into groups in accordance with an output of said separation designating means and filing each of said groups of the image information as a block of document data,
    wherein said detecting means carries out a logical OR between image data of said specified area of the separating sheet and data which is obtained by shifting the image data by an amount of one dot in a lateral direction, and detecting the separating sheet based on first data represented by the logical OR so as to eliminate noise from the image information.

9. The image information processing apparatus according to claim 8,
    wherein said detecting means carries out a logical OR between the first data and data which is obtained by shifting the image data by an amount of one dot in a vertical direction, and detecting the separating sheet based on second data represented by the logical OR so as to eliminate noise from the image information.

10. The image information processing apparatus according to claim 9,
    wherein said detecting means determines that a sheet having no data representing a white dot in the second data is the separating sheet.

11. The image information processing apparatus according to claim 10,
    wherein the specified area is an entire area of a sheet except a peripheral area thereof.

12. The image information processing apparatus according to claim 9, further comprising storage location designating means for specifying a storage location for each of said groups of the image information.

13. The image information processing apparatus according to claim 9, further comprising classification controlling means for extracting a classification control sheet inserted before or after the separating sheet and controlling a grouping of the document data in accordance with classification control information indicated by the classification control sheet.

14. The image information processing apparatus according to claim 13 wherein a plurality of classification control sheets are inserted before or after the separating sheet and said classification controlling means further controls the grouping of the document data in accordance with a plurality of detailed categories.

15. An image information processing apparatus comprising:

inputting means for sequentially inputting a plurality of documents as image information;

detecting means for detecting a separating sheet with a specified area containing a specific picture, the separating sheet being inserted between the documents, the specific picture not being represented by a binary code;

separation designating means for designating a grouping of the image information according to a position of the separating sheet inserted; and memory mean for separating the image information into groups in accordance with an output of said separation designating means, filing each of said groups of the image information as a block of document data, and storing therein data of the specific picture in advance of each of said groups, wherein said detecting means detects the separating sheet by comparing the image data of the specified area of each the separating sheet with data of pictures stored in a second memory.

16. The image information processing apparatus according to claim 15,
wherein said memory means includes storing means for storing data of the specific picture.

17. The image information processing apparatus according to claim 16, further comprising printing means for printing the data of the specific picture stored in said memory means.

18. The image information processing apparatus according to claim 15, further comprising classification controlling means for extracting a classification control sheet inserted before or after the separating sheet and controlling a grouping of said document data in accordance with classification control information indicated by the classification control sheet.

19. The image information processing apparatus according to claim 18 wherein a plurality of classification control sheets are inserted before or after the separating sheet and said classification controlling means further controls the grouping of the document data in accordance with a plurality of detailed categories.

* * * * *